Patented Sept. 21, 1948

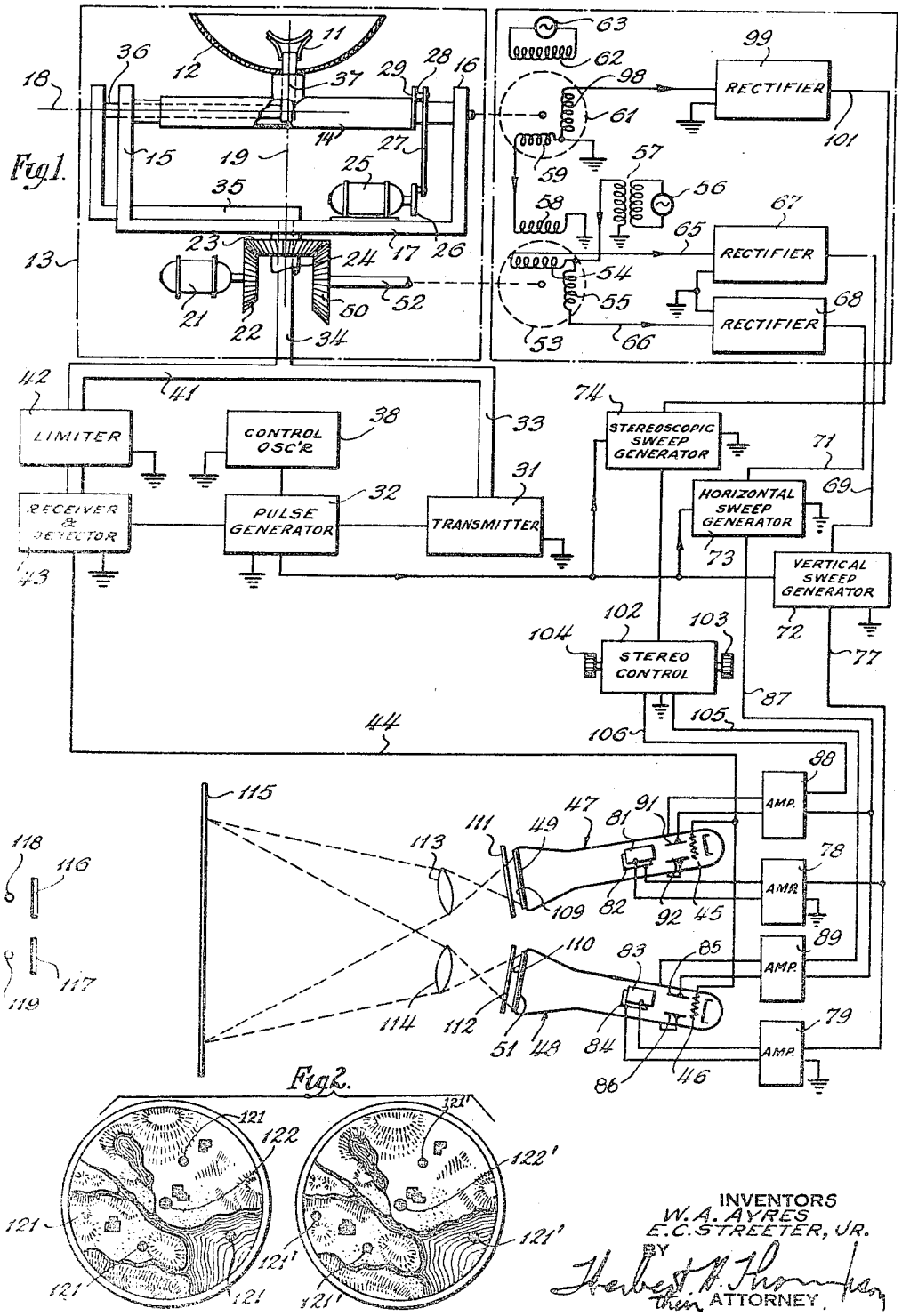

2,449,542

UNITED STATES PATENT OFFICE 2,449,542

RADIO OBJECT LOCATING DEVICE FOR PRODUCING STEREOSCOPIC IMAGES

Waldemar A. Ayres, Kew Gardens Hills, and Edward C. Streeter, Jr., Old Westbury, N. Y., assignors to The Sperry Corporation, a corporation of Delaware Application August 14, 1943, Serial No. 498,606

19 Claims. (Cl. 343—10)

This invention relates generally to the stereoscopic presentation of an image showing the relative positions of a plurality of objects, and particularly concerns the relation of the objects to a background or base.

The major object of the invention is to provide an image showing the position of one or more objects in which a stereoscopic displacement of the image of each object is determined by its particular distance from a reference plane.

Another object of the invention is to provide a three-dimensional picture of the position of one or more objects superimposed upon an image of a reference plane.

A further object of the invention is to provide a composite three-dimensional picture composed of stereoscopically displaced images of the position of objects and stereoscopically displaced images of a reference plane.

A further object of the invention is to provide stereoscopic images of the position of objects over a selected ground area in which the stereoscopic displacement is determined by the height of the objects above the ground plane.

A further object of the invention is to provide a three-dimensional picture of a selected ground area and objects over the area in which stereoscopically displaced images of the ground are combined with stereoscopically displaced images of the objects.

A still further object of the invention is to provide stereoscopic image-producing apparatus in which a locator determines the distance of an object with respect to a reference plane, and an image of the position of the object is provided having a stereoscopic displacement corresponding to the determined distance.

Other objects and advantages of the invention will become apparent from the following description.

In accomplishing these objects the space over a selected ground area is scanned by a locator which detects the presence of objects and determines their goniometric position as well as their range. With this data it is possible to determine the altitude and the horizontal range of the detected objects.

The locator actuates indicators which provide two images showing an orthogonal projection of the objects to the plane of the ground. However, the image of each object is displaced relative to its corresponding image by an amount corresponding to its respective altitude. In this manner, dual images are provided, which, when seen independently by the separate eyes of an observer, are fused in his brain to form a three-dimensional image.

In order to show the relation of these objects to the ground, each of the dual images is combined with a stereoscopic image of the selected ground area. Then, the two combined images are projected onto a screen by differently polarized light rays. An observer wears polarized lenses so the dual images are seen independently by his two eyes.

Fusion of the stereoscopically displaced images in the brain of the observer forms a three-dimensional picture showing contour of the ground and the altitude of each of the objects relative to the ground.

Fig. 1 shows a schematic diagram of one form of apparatus for carrying out the invention.

Fig. 2 is a drawing of sample composite stereoscopic images which are provided by the apparaus, and may be fused in the brain of the observer to provide a three-dimensional picture.

The most convenient method of scanning a selected portion of space is by a radio detection and locator system. Many systems have already been developed in which ultra high frequency radiant energy is utilized to determine the goniometric position of objects as well as their respective ranges. A directional antenna used with such apparatus may be moved to periodically scan any desired portion of space, such as a hemisphere. Radiant energy reflected by an object located in the portion of space is received by the antenna and detected to ascertain the direction and range of the object relative to the antenna.

As shown in Fig. 1 a directional antenna 11, having a parabolic reflector 12 is arranged in a scanner 13. The scanner is adapted to periodically sweep the beam pattern of the antenna over a portion of space such as a hemisphere. The antenna is carried by a shaft 14 that is mounted in arms 15 and 16 of bracket 17 for rotation about a horizontal axis 18. The bracket 17 is continuously rotated or spun about the vertical axis 19 by a motor 21 which drives through bevel gears 22 and 23 to rotate a shaft 24 carrying the bracket. A motor 25 is carried by the bracket 17 and is arranged to drive through an eccentric 26. Link 27 and a pin 28 on lever 29 slowly oscillate the shaft 14, thereby "nodding" the antenna 11 about the horizontal axis 18. The oscillation on "nodding" movement of the antenna is slow as compared to the "spinning" or rotation thereof about the vertical axis 19.

From this description of the structure of the scanner 13 it will be apparent that the directional beam pattern of the antenna spirally scans a portion of space. It may start by making a revolution with the antenna 11 arranged as shown in the drawings and pointed directly upward. As the antenna continues to spin, the nod angle (the angle of the beam pattern relative to a horizontal plane) is gradually reduced so the directional beam pattern moves spirally downward until it reaches the horizon, at which time it reverses and slowly scans upward in the same manner. While this scanning mechanism is simple and convenient to use, obviously any type of scanner may be substituted in the apparatus without departing from the invention. Such scanners may sweep the antenna to scan any desired portion of space in any desired manner.

In accordance with known practices a high frequency radio transmitter 31 is triggered by a pulse generator 32 to transmit short, sharp pulses of high frequency energy by wave guides 33 and 34 to the scanner. Wave guides 35, 36 and 37 in the scanner, including necessary rotating joints, supply these high frequency pulses to the antenna where they are radiated into space in a direction depending upon the position of the antenna. The radiated pulses are of very short duration, usually of the order of one microsecond or less, and are repeated at a rate determined by a control oscillator 38 which actuates the pulse generator 32.

These pulses of high frequency energy may be reflected by objects lying within the directional beam pattern of the antenna. The reflected pulses are picked up by the antenna 11 and transmitted by the wave guides 37, 36, 35 and 34 to wave guide 41 which is connected to limiter 42. The purpose of the limiter 42 is to block passage of high power transmitted pulses of high frequency energy, but to pass lower power reflected pulses to a receiver 43. Such devices as illustrated by the limiter 42 are more commonly known as "TR" boxes. Other functions and construction of these limiters are more adequately described in an article entitled "Considerations in the design of centimeter-wave radar receivers," by Stewart E. Miller, appearing in the April 1947 I. R. E. Proceedings.

Receiver 43 detects the high frequency pulses and amplifies the detected signals so they may be applied as by lead 44 to intensity control grids 45 and 46 of cathode ray tubes 47 and 48 which may be of the projection type. The electron beams of these tubes scan their respective screens 49 and 51 in a manner now to be described.

The electron beams of the two cathode ray tubes 47 and 48 are deflected identically by sawtooth voltages applied to the deflecting plates at a rate corresponding to the frequency of the control oscillator 38. These saw-tooth voltages are adjusted to cause the electron beams to sweep radially from the center of the screens of the tubes in a direction dependent upon the relative amplitudes of the voltages applied to the horizontal and vertical plates. The amplitudes of these voltages are varied sinusoidally in accordance with spinning of the antenna 11 about the vertical axis 19, the sinusoidal variations of the horizontal and vertical plate voltages being displaced in phase 90°. This causes the radial sweep to have a direction corresponding to a projection of the antenna beam pattern to a horizontal plane at any instant.

The amplitudes of the sweeping voltages are further modified in accordance with the nod position of the scanner 13, that is, its position relative to a horizontal plane. In this manner the length of each radial sweep is determined by the nod angle which corresponds to the orthogonal projection of a beam pattern of finite length. It will be apparent, therefore, that the electron beams of the two cathode ray tubes are scanned radially in a direction corresponding to the direction of the directional beam pattern of the antenna 11 and by an amount that is varied in accordance with the angle of the beam pattern relative to a horizontal plane. The time of each radial sweep is controlled by the control oscillator 38 according to the repetition rate of transmitted pulses. Thus, the time is constant regardless of the length of the sweep.

Therefore, the electron beams move more slowly during short sweeps than during longer ones. Several possible methods have been suggested for obtaining the necessary deflection voltages. For example, a rotary potentiometer energized from a suitable direct current source could be arranged to have its slider adjusted by the nodding motion of the antenna. The output voltage could be applied through the buffer amplifier across a second rotary potentiometer having a pair of sliders displaced by 90° and rotated according to spinning movements of the antenna. However, the use of rotating contacts and other mechanical disadvantages of such a system may be overcome by substituting a voltage-generating system such as that shown in the drawing.

The voltages displaced by 90 degrees for rotating the electron beams in accordance with rotation of the antenna about the vertical axis 19 are produced by a generator having a rotor 53 carrying two-phase windings 54 and 55 displaced by 90 degrees. The rotor 53 is rotated in accordance with the spinning movements of the antenna 11 by a shaft 52 that is driven by a gear 50 meshing with the bevel gear 23. In order to determine the distance that the electron beams move during each radial sweep, the amplitudes of these two-phase voltages are varied according to the nodding movements of the antenna.

This is accomplished by varying the field strength of the generator which is determined by the voltage applied to stator winding 58. The stator winding 58 is connected to secondary winding 59 on rotor 61 of a rotary transformer driven by the shaft 29 according to the nodding oscillations of the antenna. Primary winding 62 of the rotary transformer is energized from a suitable constant source 63 of alternating current. The output voltage of the secondary winding 59 depends upon its position relative to the primary winding 62 and varies cosinusoidally according to the nod angle of the antenna 11. This varying voltage is applied to the stator winding 58 of the two-phase generator, the rotor 53 of which is rotating at the spin frequency of the antenna.

The voltages of rotor windings 54 and 55 depend upon the product of the voltages induced in the windings by the voltage applied to stator or field winding 58, and the voltage generated by rotation of the rotor windings in the magnetic field of stator winding 58. As is well known, the multiplication of two sine wave voltages produces voltages having frequencies equal to the sum and difference of the frequencies of the two sine waves. These two sum and difference frequencies correspond to two side bands without a carrier.

In the present case, the multiplication of the induced and generated voltages in rotor windings 54 and 55 results in voltages having sum and difference frequencies. However, the amplitudes of these voltages (the amplitude of the side bands) are varied in accordance with the nod angle of the antenna. A suitable carrier may be inserted at this point by connecting a source 56 of alternating current voltage through transformer 57 to the rotor windings 54 and 55.

The voltages now appearing across windings 54 and 55 may be represented as a carrier modulated at the spin frequency and varied in amplitude according to the nod angle. These voltages are similar, but are displaced by 90° due to the relative positions of the rotor windings 54 and 55. The voltages of the two-phase rotor windings are supplied as by leads 65 and 66 to rectifiers 67 and 68. The envelopes of the voltages of leads 65 and 66 are detected by the rectifiers 67 and 68 and connected by leads 69 and 71 to control the amplitudes of the outputs of saw-tooth generators 72 and 73.

Saw-tooth generators 72 and 73, as well as a stereoscopic sweep generator 74 are triggered by the pulse generator 32 to produce saw-tooth voltage waves at a frequency corresponding to the frequency of the transmitted pulses. These saw-tooth voltage generators are of such design that they may have either positive or negative voltage outputs depending upon the polarity of the control voltages from rectifiers 67 and 68. Furthermore, the amplitudes of the saw-tooth voltages are varied in accordance with the magnitude of the control voltages.

The output of the saw-tooth generator 72 is connected as by lead 77 to vertical control amplifiers 78 and 79 for the tubes 47 and 48 respectively. These amplifiers may be balanced direct current amplifiers, which are connected to the vertical deflecting plates. The vertical control amplifier 78 is connected to vertical deflecting plates 82 and 81 of the cathode ray tube 47. Similarly, the output of the vertical control amplifier 79 is connected to vertical deflecting plates 83 and 84 of the cathode ray tube 48. The output of the saw-tooth generator 73 may be connected by lead 87 to balanced direct current horizontal control amplifiers 88 and 89, which are connected to the horizontal deflecting plates of the tubes 47 and 48 respectively. The horizontal control amplifier 88 is connected to horizontal deflecting plates 91 and 92 of the cathode ray tube 47. Similarly, horizontal control amplifier 89 is connected to horizontal deflecting plates 85 and 86 of the cathode ray tube 48.

The apparatus thus far described sweeps the electron beams of the tubes to scan their respective screens 49 and 51 in a manner which, if the beam is turned on, would produce traces corresponding to an orthogonal projection of the beam pattern to a horizontal plane. The length of each radial sweep is modified to correspond to a projection of a finite length of the antenna beam pattern to a horizontal plane. It will be apparent that the electron beam would, if turned on, describe a long, radial trace if the nod angle i zero. This trace gradually shortens as the nod angle increases and will become a point when the angle is a maximum.

Actuation of the intensity control grids 45 and 46 by the reception of a reflected pulse causes a spot to appear on the screens of the tubes. The position of these spots corresponds to an orthogonal projection of the position of the reflecting object. The indications appearing on the two tubes are identical and both give an indication of the approximate position of an object. However, they do not give any indication of the distance of the object either with relation to the antenna or to other detected objects.

This additional indication is provided by displacing the two images in opposite directions according to the altitudes of the respective objects. Obviously a stereoscopic indication may be obtained by displacing only one of the images, but it would be somewhat distorted. Preferably, as shown in Fig. 1, the images appearing on the two screens 49 and 51 are displaced horizontally in opposite directions according to the altitude of the objects shown thereon. The time interval between the transmission of a pulse energy of antenna 11, and the reception of a reflected pulse may be measured to provide a measure of the linear distance of the object from the antenna. However, it is desired to determine the altitude of the objects. Since the nod angle of the antenna corresponds to the angle of the directional beam pattern relative to a horizontal plane, it is apparent that the distance of the object above a horizontal plane is equal to the range of the object from the antenna multiplied by the sine of the nod angle.

A voltage corresponding to the sine of the nod angle is obtained by a winding 98 on the rotor 61 of the rotary transformer that is driven by shaft 14 in accordance with the nod angle.

This voltage is supplied to a rectifier 99 the output of which is connected by lead 101 to the saw-tooth voltage generator 74 that is triggered by pulse generator 32. The output of this generator may be a voltage of any desired wave form having a frequency corresponding to the repetition rate of transmitted pulses and an amplitude dependent upon the sine of the nod angle of the antenna. This voltage is supplied to a stereoscopic control unit 102 which includes a balanced amplifier having variable controls that may be operated by knobs 103 and 104 to vary the direct current level as well as the amplification factor. One side of the balanced output of the stereoscopic control is connected as by lead 106 to the horizontal control amplifier 88, and the other side having an opposite polarity is connected as by lead 105 to the horizontal control amplifier 89. The amplifiers 88 and 89 are controlled by two voltages, the first of which positions the electron beam corresponding to the position of the beam pattern of the antenna, and the second of which shifts the entire pattern horizontally during each cycle as the beam sweeps radially.

As previously explained, the time required for each radial sweep of the electron beams is constant regardless of the length of the sweep. The elapsed time from the beginning of a sweep until a spot corresponding to the image of an object appears depends upon the range of an object. During this time interval, the beams are shifted horizontally in opposite directions by the stereoscopic control voltages, the amplitude of which depends upon the sine of the nod angle. Therefore, the distance which the beams are shifted depends upon the altitude of the detected object.

The image now appearing on the tube 49 shows the detected objects in their relative positions, but displaced horizontally in accordance with their respective altitudes. A similar indication is shown on the screen of the tube 51, but the objects are shifted in the opposite direction. Thus, the images represent orthogonal projections of the goniometric position of the objects, but shifted in accordance with their respective altitudes. These dual stereoscopic images when viewed independently by the two eyes of an observer will be fused in the observer's brain to provide him with a three-dimensional picture showing the objects in their true position, including their height above the ground.

The beams may be shifted in either direction depending upon the point of view which the observer is intended to have for the desired presentation. If the stereoscopic presentation is to produce a picture which the observer would have looking downward, the objects having the greatest altitude would appear nearest to the observer. Assuming all objects are to appear behind the surfaces of the screens, the electron beams will be displaced toward each other so objects at the level of the ground would have the maximum stereoscopic displacement.

Since objects at ground level would have zero height, they would have a stereoscopic displacement determined by the direct current voltage difference between leads 105 and 106, forming the output of stereoscopic control 102, which is controlled by knob 103 as previously explained.

By reversing the output leads 105 and 106 the stereoscopic presentation may be modified so it will appear as though the observer were looking upward at the object. In this case, the images are moved away from each other a distance dependent upon the height of the objects so the higher objects appear further away.

The amplitude knob 104 of the stereoscopic control may be adjusted to vary the amplification, thereby changing the contrast for objects having different heights. This adjustment may be made by the observer to suit his particular desires.

The correct stereoscopic displacement of two images does not vary linearly according to the distance of the object from the observer. Actually, the stereoscopic displacement should vary according to a hyperbolic function of the distance. In the present embodiment of the invention, the observer is considered to be a relatively great distance from the objects above the ground or other reference plane. Therefore, the stereoscopic displacement, within the desired limits, varies as a substantially linear function of the distance and a saw-tooth sweep voltage may be used. When the invention is used to produce stereoscopic images of objects closer to the observer, a hyperbolic or other type of stereoscopic sweep generator may be substituted for the generator 74.

One method of supplying these images independently to the eyes of the observer is to project them through polarizing screens 111 and 112, and focusing them as by lenses 113 and 114 on a transparent projection screen 115, whereby the two polarized images are superimposed. It is, of course, necessary to polarize the images in different directions, so polarizing discs 116 and 117, worn by the observer will separate the superimposed images and supply them independently to his separate eyes 118 and 119.

The advantage of projecting the images onto a single screen is that it permits the observer to move relative to the screen and still continuously observe the objects in their correct relative positions.

In some instances it may be desirable to provide a background for the images, such as a picture or map of the selected ground area over which the objects are located. Such an image may be superimposed upon the dual stereoscopic images by placing transparent photographic positive films 109 and 110 over the faces of tubes 47 and 48. In this conventional manner, light may be projected through the films to form images on a screen. The sensitiveness of cathode ray tubes and their associated circuits may be adjusted so that a dull glow is always present over the entire surface of the screens 49 and 51, whereby enough light is continuously projected through all portions of the transparent photographs to produce the stereoscopically displaced background images. These stereoscopically displaced background images are formed on the screen 115.

Spots representing indications of objects in the air are superimposed upon the background images and are combined therewith to form composite stereoscopic images, which, when viewed independently by the eyes of the observer, are fused in his brain to form a three-dimensional picture including the background as well as the objects. The height of the observer relative to the ground is determined by the displacement of the two background images on the screen. This displacement can, of course, be easily adjusted by moving the respective polarizing screen.

The invention utilizes the range and position of the object as determined by the radio locator to provide an image of the position of the object displaced in accordance with its altitude. Two images formed in this manner, but displaced in opposite directions, provide a stereoscopic representation of the objects. This representation is superimposed upon an image of the ground. If desired the ground image may be formed of dual stereoscopically displaced images and combined with the dual stereoscopic images of the position of the objects to produce composite stereoscopic images showing the objects in their relation to the contour of the ground.

Fig. 2 shows images corresponding to those appearing at the lenses 113 and 114 which are superimposed upon the screen 115. The background, as shown in these images is determined by the picture on photographic films 109 and 110. The targets 121 and 121' are formed on the screens of the cathode ray tubes.

One important use of the invention is in air traffic control for the area surrounding an airport. For example, an airport may be located at the center of an area, as shown at 122 and 122' in the images of Fig. 2. The observer is provided with an indication of all aircraft within a selected area. These indications are stereoscopic images to indicate the altitudes of the various aircraft relative to each other, and in addition indicate their distances above various points on the ground. When the invention is used in this manner the photographic positive films 109 and 110 produce stereoscopic images of the ground area surrounding the airport. Cathode ray tubes provide stereoscopic images of the aircraft over the selected area. The altitude of all of the craft may be adjusted to a correct value by adjusting knob 103 to provide the correct direct current level of the output of the stereoscopic control. The scale, that is, the height between each of the craft may be varied by adjusting knob 104 to vary the amplification of the stereoscopic control amplifier. Thus, if the background or map formed by the films 109 and 110 is of a large scale, the amplification of the stereoscopic control will be increased, whereas, it will be reduced when a small scale background image is used in order to view a larger area.

The embodiment of the invention illustrated and described herein relates to apparatus for providing stereoscopic indication of objects showing their relative heights above the ground. It should be understood, however, that any desired geometric plane may be substituted for the ground and the detected objects indicated stereoscopically by images displaced according to the distance of the object relative to the selected plane.

For example, the scanner could be carried by aircraft and scan the area ahead of the aircraft. In such an application of the invention, all objects ahead of the aircraft could be indicated stereoscopically by dual images displaced in opposite directions by amounts corresponding to the distance of the objects relative to a plane including the scanner and perpendicular to the longitudinal axis of the aircraft.

It would probably also be preferable to have the observer looking outward from the aircraft so images of the objects would be shifted away from each other. If desired, a foreground could be provided by having the photographic positives produce an image of the aircraft's outline. In this manner the images of the object and the aircraft would be combined to provide composite stereoscopic images showing the positions of the objects relative to the aircraft.

The particular embodiment of the invention herein described in detail provides a synchronously timed voltage generator to shift the electron beams according to the distance of objects relative to the reference plane. This arrangement is particularly adapted to indicators utilizing a revolving radial scanning system. It is contemplated that other scanning systems may be used in which case a modified stereoscopic bias generator may be necessary.

As an example, the scanning system could be of a conventional type to cause the electron beam to scan in the same manner as the scanner. This could be easily accomplished by merely eliminating the radial scanning from the system described herein, as by removing the saw-tooth generators. To properly shift the electron beams in accordance with the distance of the objects, the range could be measured according to the time elapsing between transmitted and received pulses. This measured range would then be multiplied by the sine of the nod angle to determine the distance of the object from the reference plane. The voltage represented by this product would form the stereoscopic bias to shift the images of the objects on the two screens in opposite directions.

Any selected reference plane would normally be the plane represented by the base of the area which is scanned, however, any plane parallel to this base may be selected by appropriately adjusting the direct current level of the stereoscopic control amplifier by knob 123.

As many changes could be made in the above construction and many apparently widely different embodiments of this invention could be made without departing from the scope thereof, it is intended that all matter contained in the above description or shown in the accompanying drawings shall be interpretated as illustrative and not in a limiting sense.

What is claimed is:

1. In stereoscopic apparatus, means for producing dual images of an object displaced according to the distance of the object relative to a plane, and means for combining an image of said plane with said dual images.

2. In stereoscopic apparatus, means for producing dual images of an object displaced according to the distance of said object relative to a plane, and means for combining a pair of stereoscopically shifted images of said plane with said dual images.

3. In stereoscopic apparatus, a locator for determining the position of an object and the distance of said object from a surface, an indicator actuated by said locator for providing dual images of the position of said object, means for laterally separating said images according to said distance, and means for combining an image of said surface with said dual images.

4. In apparatus for providing a three-dimensional representation of objects over a selected ground area, comprising a locator for scanning the space above said ground area to determine the position of an object and the height of said object above said ground area, an indicator for producing dual images of the position of said object displaced according to said height, and means for combining each of said dual images with one of a pair of stereoscopic images of said ground area.

5. In stereoscopic apparatus, means for obtaining data defining the position of an object in space with reference to a point, means for modifying said data to redefine the position of the object as projected upon a surface, means responsive to the initial data for determining the distance of the object from said surface, an indicating screen, and means responsive to said data modifying means and said distance determining means for indicating an image on said screen representing the object said image being displaced laterally from a position corresponding to said projected position in accordance with said distance.

6. Radio object detecting apparatus comprising transmitting means for irradiating an object with radio waves, directionally sensitive receiving means responsive to waves returned from said object for deriving a signal therefrom, indicator means for forming dual images of said object in response to said signal, means for laterally separating said dual images as a function of the time interval between transmission of waves to said object and reception of waves therefrom, means for controlling the amplitude of lateral separation of said dual images in accordance with the sensitive direction of said receiving means, and means for viewing said images stereoscopically.

7. In stereoscopic apparatus, a locator for determining the position of an object as projected on a surface and the distance of said object relative to said surface, an indicating screen, and means actuated by said locator for representing said object on said screen by an image transversely displaced from a position corresponding to said projected position by an amount dependent upon said distance relative to said surface.

8. In stereoscopic apparatus, a locator for determining the direction and range of an object, means actuated by said locator for determining the distance of said object relative to a surface, an indicating screen, and means actuated by said locator and said distance determining means for projecting a pair of images on said screen, with said images being projected in a position according to said direction and range and laterally displaced relative to each other according to said distance.

9. In stereoscopic apparatus, a locator for determining the goniometric position of an object and the distance of said object relative to a plane, an indicating screen, and means actuated by said locator for representing said object on said screen by an image laterally displaced from a position corresponding to an orthogonal projection of said goniometric position on said plane by an amount dependent upon said distance relative to said plane.

10. In stereoscopic apparatus, a locator for determining the position of an object as projected on a surface and the distance of said object relative to said surface, an indicating screen, and means actuated by said locator for representing said object on said screen by dual images laterally displaced in opposite directions from a position corresponding to said projected position by an amount dependent upon said distance relative to said surface.

11. In stereoscopic apparatus, a radio locator having a directional antenna for determining the direction of an object and timing means for determining the range thereof, data modifying means actuated by said locator according to the orientation of said antenna relative to a plane and the range of said object for determining the distance of said object relative to said plane, an indicating screen, and means actuated by said locator and said data modifying means for representing said object on said screen by a pair of images laterally displaced relative to each other by an amount dependent upon said distance relative to said plane.

12. In stereoscopic apparatus, a radio locator having a directional antenna for determining the goniometric position and timing means for determining the range of an object, data modifying means actuated by said locator according to the angular position of said antenna relative to a surface and the range of said object for determining the distance of said object relative to said surface, an indicating screen, and means actuated by said locator and said data modifying means for representing said object on said screen by an image laterally displaced from a position corresponding to an orthogonal projection of the position of said object on said surface by an amount dependent upon said distance relative to said surface.

13. In stereoscopic apparatus, a locator for determining the position of an object as projected on a surface and the distance of said object relative to said surface, an indicating screen, means actuated by said locator for representing said object on said screen by an image laterally displaced from a position corresponding to said projected position by an amount dependent upon said distance relative to said surface, and means for combining an image of said surface with said object image.

14. Radio object detecting apparatus comprising transmitting means for irradiating an object with radio waves, directionally sensitive receiving means responsive to waves returned from said object for deriving a signal therefrom, indicator means for forming dual images of said object in response to said signal, means for positioning said images in accordance with the time interval between transmission of waves to said object and reception of waves therefrom and also the sensitive direction of said receiving means, means for laterally separating said dual images as a function of said time interval, means for controlling the amplitude of lateral separation of said dual images in accordance with said sensitive direction, and means for viewing said images stereoscopically.

15. Radio object detecting apparatus comprising means for generating radio waves, means for sweeping said waves in a beam about two substantially perpendicular axes to irradiate an object with said waves, receiving means responsive to waves returned from said object for deriving a signal therefrom, indicator means for forming dual images of said object in response to said signal, means for positioning said images in accordance with the direction of said beam measured about one of said axes and the time interval between transmission of waves to said object and reception of waves therefrom, means for laterally separating said dual images in accordance with the direction of said beam measured about the other of said axes and said time interval, and means for viewing said images stereoscopically.

16. Radio object detecting apparatus comprising means for generating radio waves, scanning means for sweeping said waves about perpendicularly related spin and nod axes to irradiate an object with said waves, receiving means responsive to waves returned from said object for deriving a signal therefrom, indicator means for forming dual images of said object in response to said signal, means for positioning said images in accordance with the spin and nod angles of said beam and the time interval between transmission of waves to said object and reception of waves therefrom, means for laterally separating said images in accordance with said nod angle and said time interval, and means for viewing said images stereoscopically.

17. Radio object detecting apparatus comprising means for generating radio waves, scanning means for sweeping a beam of said waves in azimuth and elevation to irradiate an object with said waves, receiving means responsive to waves returned from said object for deriving a signal therefrom, indicator means for forming dual images of said object in response to said signal, means for displacing said images perpendicularly to a line of sight in accordance with the time interval between transmission of waves to said object and reception of waves therefrom, means for positioning said images angularly about said line of sight in accordance with the azimuth angle of said beam, means for separating said dual images transversely to said line of sight in accordance with the elevation angle of said beam and said time interval, and stereoscopic means for viewing said images generally parallel to said line of sight.

18. Radio object detecting apparatus comprising means for generating radio waves, scanning means for sweeping a beam of said waves in azimuth and elevation to irradiate an object with said waves, receiving means responsive to waves returned from said object for deriving a signal therefrom, indicator means for forming dual images of said object in response to said signal, means for displacing said images perpendicularly to a line of sight in accordance with the elevation angle of said beam and the time interval between transmission of waves to said object and reception of waves therefrom, means for positioning said images angularly about said line of sight in accordance with the azimuth angle of said beam, means for separating said dual images transversely to said line of sight in accordance with the elevation angle of said beam and said time interval, and stereoscopic means for viewing said images generally parallel to said line of sight.

19. Radio object detecting apparatus comprising means for generating radio waves, scanning means for sweeping a beam of said waves in azimuth and elevation to irradiate an object with said waves, receiving means responsive to waves returned from said object for deriving a signal therefrom, indicator means for forming dual images of said object in response to said signal, means for displacing said images perpendicularly to a line of sight an amount proportional to the product of the time interval between transmission of waves to said object and reception of waves therefrom and the cosine of the elevation angle of said beam, means for positioning said images angularly about said line of sight in accordance with the azimuth angle of said beam, means for separating said dual images transversely to said line of sight an amount proportional to the product of said time interval and the sine of said elevation angle, and stereoscopic means for viewing said images generally parallel to said line of sight.

WALDEMAR A. AYRES.
EDWARD C. STREETER, Jr.

REFERENCES CITED

The following references are of record in the file of this patent:

UNITED STATES PATENTS

| Number | Name | Date |
| --- | --- | --- |
| 1,358,721 | Fujii | Nov. 16, 1920 |
| 1,433,070 | Conners | Oct. 24, 1922 |
| 1,698,221 | Craig | Jan. 8, 1929 |
| 2,115,626 | French | Apr. 26, 1938 |
| 2,171,561 | Hooven | Sept. 5, 1939 |